US008772357B2

(12) United States Patent
Guignot et al.

(10) Patent No.: US 8,772,357 B2

(45) Date of Patent: Jul. 8, 2014

(54) DECONTAMINATION, STRIPPING AND/OR DEGREASING FOAM CONTAINING SOLID PARTICLES

(75) Inventors: Sylvain Guignot, Montpellier (FR); Sylvain Faure, Venasque (FR)

(73) Assignees: Commissariat a l'Energie Atomique, Paris (FR); Areva NC, Paris (FR)

( * ) Notice: Subject to any disclaimer, the term of this patent is extended or adjusted under 35 U.S.C. 154(b) by 575 days.

(21) Appl. No.: 12/525,836

(22) PCT Filed: Feb. 14, 2008

(86) PCT No.: PCT/EP2008/051792
§ 371 (c)(1),
(2), (4) Date: Nov. 30, 2009

(87) PCT Pub. No.: WO2008/101855
PCT Pub. Date: Aug. 28, 2008

(65) Prior Publication Data

US 2010/0069281 A1 Mar. 18, 2010

(30) Foreign Application Priority Data

Feb. 15, 2007 (FR) ...................................... 07 53286

(51) Int. Cl.
*C09K 8/518* (2006.01)
*C09K 8/52* (2006.01)

(52) U.S. Cl.
USPC ............. 516/11; 510/302; 510/323; 510/365; 510/370; 510/397; 510/418; 510/507; 510/508; 510/511; 252/8.05

(58) Field of Classification Search
USPC ......... 510/302, 319, 323, 351, 370, 365, 383, 510/418, 397, 507, 508, 511; 252/8.05; 516/11
See application file for complete search history.

(56) References Cited

U.S. PATENT DOCUMENTS

| | | | | |
|---|---|---|---|---|
| 3,639,290 A * | 2/1972 | Fearnley et al. | ................ | 428/96 |
| 4,228,048 A | 10/1980 | Tesdahl | | |
| 5,955,414 A * | 9/1999 | Brown et al. | ................. | 510/279 |
| 6,387,870 B1 * | 5/2002 | Klaers et al. | .................. | 510/445 |

(Continued)

FOREIGN PATENT DOCUMENTS

| | | |
|---|---|---|
| EP | 1 053 277 | 11/2000 |
| FR | 2 457 320 | 12/1980 |

(Continued)

OTHER PUBLICATIONS

Reculusa et al., "Hybrid Dissymmetical Colloidal Particles", Chemical Mater., vol. 17, No. 13, 2005, pp. 3338-3344.

*Primary Examiner* — Gregory R Delcotto
(74) *Attorney, Agent, or Firm* — Miles & Stockbridge P.C.

(57) ABSTRACT

A stabilized foam formed from a foaming aqueous solution comprising from 0.1 to 7 mol of one or more decontamination, stripping and/or degreasing reactants per liter of solution and from 0.01 to 15% by weight of a solid stabilizing agent of solid particles type, with respect to the total weight of the solution, and a process for the preparation of said stabilized foam, to its use in decontaminating, stripping and/or degreasing a surface and to a process for decontaminating, stripping and/or degreasing a surface.

7 Claims, 3 Drawing Sheets

(56) References Cited

U.S. PATENT DOCUMENTS

| | | | | |
|---|---|---|---|---|
| 6,685,966 | B1 | 2/2004 | Dominique et al. | |
| 6,818,204 | B2 * | 11/2004 | Lapidus | 424/43 |
| 2003/0078180 | A1 | 4/2003 | Munoz, Jr. et al. | |
| 2004/0051188 | A1 | 3/2004 | Turchet et al. | |
| 2004/0171507 | A1 * | 9/2004 | Kellar et al. | 510/367 |
| 2005/0043206 | A1 * | 2/2005 | Munoz et al. | 510/475 |
| 2006/0211592 | A1 | 9/2006 | Faure et al. | |

FOREIGN PATENT DOCUMENTS

| | | | |
|---|---|---|---|
| FR | 2 566 796 | | 1/1986 |
| FR | 2 774 994 | | 2/1998 |
| FR | 2 817 170 | A1 | 5/2002 |
| FR | 2 841 802 | | 1/2004 |
| GB | 2 155 032 | A | 9/1985 |
| WO | WO 99/41298 | | 8/1999 |
| WO | WO 2004/008463 | A2 | 11/2004 |

* cited by examiner

DECONTAMINATION, STRIPPING AND/OR DEGREASING FOAM CONTAINING SOLID PARTICLES

TECHNICAL FIELD

The present invention relates to the field of the decontamination, stripping and degreasing of surfaces. The surfaces to be treated in the context of the present invention can be metal or nonmetal surfaces which are more or less accessible and which are contaminated by grease, by radioactive inorganic deposits or by a layer of oxide or which are contaminated throughout the structure.

Thus, the present invention provides a solution, a composition and a foam for decontaminating, stripping and degreasing such surfaces. The composition and the solution according to the present invention make it possible to obtain a foam capable of decontaminating, stripping and/or degreasing any type of surface and more particularly a foam comprising a solid stabilizing agent, such as solid particles. The present invention also relates to a process for the preparation of said foam and to its use.

PRIOR STATE OF THE ART

Numerous decontamination, stripping and/or degreasing compositions for the treatment of surfaces are known in the state of the art. These compositions can be provided both in the form of gels and in the form of foams.

The previous studies of the Applicant have made it possible in particular to develop a gelled (or viscosified) decontamination foam comprising from 0.2 to 2% by weight of foaming organic surface-active agent(s), from 0.1 to 1.5% by weight of gelling agent and from 0.2 to 7M of inorganic acid(s) or base(s) for radioactive decontamination. Such a gelled foam is described in international application WO 2004/008463. This foam exhibits numerous advantages with respect to compositions and very particularly with regard to decontamination compositions of the state of the art. These advantages are in particular an increased lifetime, better effectiveness in the treatment of surfaces and a reduction in the amount of effluents produced.

One objective of the present invention is to provide a foam exhibiting properties which are further improved in comparison with the foams described in international application WO 2004/008463. The improvements relate very particularly to the amount of surfactant(s) necessary to form a given volume of foam, the amount of gelling agent to stabilize the foam and the treatment of the products obtained at the end of the life of the foam, once decontamination, stripping and/or degreasing have been carried out.

ACCOUNT OF THE INVENTION

Thus, the studies of the Applicant Company have made it possible to develop a foam of use in the decontamination, stripping and degreasing of surfaces which exhibits not only the properties of the gelled foams of the state of the art (such as an increased lifetime, better effectiveness in the treatment of surfaces and a reduction in the amount of effluents produced) but also the improvements described above. This objective is achieved by means of a stabilized foam comprising a solid stabilizing agent of the solid particle type.

Specifically, the stabilized foam according to the present invention exhibits a long lifetime, of between 1 and 24 hours, guaranteeing a prolonged contact time with the surface to be treated and maintenance on this surface of a foam exhibiting a certain moisture content. These advantages are particularly advantageous when the surface to be treated comprises hot points. The lifetime of the stabilized foam according to the invention makes it possible to obtain a high decontamination, stripping and/or degreasing effectiveness and to encounter the same decontamination effectiveness as in the case of washing operations with decontaminating solutions.

Furthermore, in the case of decontamination by spraying a stabilized foam according to the invention over surfaces, the lengthening of the lifetime of this foam makes it possible to reduce the amounts sprayed, which is particularly advantageous.

The foam is composed of a dispersion of bubbles of air in liquid and is often characterized by its expansion (EV), defined, under standard conditions of temperature and pressure, by the following relationship:

$$EV=V_{foam}/V_{liquid}=(V_{gas}+V_{liquid})/V_{liquid}$$

The stabilized foam according to the invention exhibits initial expansions at the generator outlet of the order of 5 to 20 and, in the case of nuclear decontamination, of 10 to 15, which makes it possible to treat a large volume (for example 100 $m^3$) with less than 10 $m^3$ of liquid.

Finally, after the natural draining of the foam, the contaminated liquid is recovered and the wall is rinsed with a very small amount of water (approximately 1 $l/m^2$). In that way, little in the way of liquid effluents is produced, which makes possible a simplification in terms of overall procedures for subsequent treatment (less evaporation to be carried out in order to achieve the specifications for storage packages).

Furthermore, the stabilized foam according to the invention makes it possible, like the gelled foams described in international application WO 2004/008463, to remove the radioactivity from inaccessible installations, of large size or of complex geometry, by filling ("static" action), by circulating or by spraying over an accessible surface.

In order to treat, for example, the internal surfaces of large-volume fission product vessels (20 to 100 $m^3$), where the dose throughput is very high (up to 40 Gy/h) and the possibilities of access reduced, the use of a decontaminating foam which fills the vessel is particularly recommended. This is because the foam limits the liquid dead volumes by occupying all the space and by wetting all the surfaces, such as cooling coils and other items of equipment, in the middle or in the vessel head space.

The introduction of a solid stabilizing agent of the solid particle type into the foam according to the invention exhibits, in addition to the advantages expanded upon above, the following novel and unexpected advantages:

- the reduction in, indeed even the elimination of, the amount of surfactants necessary to form a given volume of foam;
- the reduction in, indeed even the elimination of, the amount of biodegradable organic gelling agent conventionally used,
- the possibility of sorption of the chemical entities, such as pollutants or radioelements, detached from the surface to be treated,
- the treatment of the products at the end of the life of the foam once decontamination, stripping and/or degreasing have been carried out.

Specifically, the stabilized foam according to the invention can be stabilized solely by the inorganic and/or organic particles present therein. The amounts of reactants necessary for the mineralization of the liquid effluent generated and the duration of the treatment (cost) are thus reduced.

When the stabilized foam according to the present invention additionally comprises a conventional stabilizing organic gelling agent (or viscosifying agent) of the prior art, the amount of said gelling agent is reduced by virtue of the compensating action of the particles. This compensating increase in stability contributed by the particles originates either from the blocking of the flow channels in the foam, slowing down the draining of the liquid, or, for high concentrations of particles (and depending on the nature of the particle and on the foaming medium), by a viscosification proper of the liquid.

The solid stabilizing agent of the solid particle type of the stabilized foam according to the invention can be positioned at the gas/liquid interfaces, partially replacing the foaming surfactants, which makes possible a reduction in the amount of surfactant used.

The solid stabilizing agent of the solid particle type can capture chemical entities and in particular the elements detached from the surface to be treated. This capturing can consist of a conventional sorption (if the solid particles are present in the solution) or else of a coprecipitation (if the solid particles are formed in situ). In the context of the decontamination of nuclear installations, the decontamination factors obtained with such particles are often greater than 100. Furthermore, the sorption takes place in the foam and can also be continued in the drained liquid.

Furthermore, after draining, the solid particles, which have or have not captured chemical entities, are easily recovered, for example by separation by settling or filtration.

The present invention thus relates to a stabilized foam formed from a foaming aqueous solution comprising:

from 0.1 to 7 mol of one or more decontamination, stripping and/or degreasing reactants per liter of solution, and from 0.01 to 25% by weight of a solid stabilizing agent, with respect to the total weight of the solution.

"Solid stabilizing agent" is understood to mean, in the context of the present invention, any solid substance which, incorporated in the foaming aqueous solution, makes it possible to improve the stability of the foam obtained from the latter. The stabilizing effect obtained can result not only in the formation of a large volume of foam but can also result in a greater persistence of the foam formed.

The solid stabilizing agent in the context of the present invention can be a single solid stabilizing agent or a mixture of solid stabilizing agents of identical or different nature. Advantageously, the solid stabilizing agent employed in the context of the present invention is provided in the form of solid particles. Use may be made, in the present invention, of solid particles of identical nature or mixtures of solid particles of different nature.

The stabilized foam formed from a foaming aqueous solution which is the subject-matter of the present invention comprises at least one solid foaming and/or sorbing agent.

In a first embodiment of the present invention, the solid stabilizing agent, in the form of solid particles, can also exhibit foaming and/or sorbing properties. Thus, in this first case, the use of solid foaming stabilizing agents, of solid sorbing stabilizing agents, of solid foaming and sorbing stabilizing agents and of their mixtures is envisaged in particular.

In a second embodiment of the present invention, a solid agent exhibiting foaming and/or sorbing properties is added to a solid stabilizing agent. Thus, in this second case, the use of a mixture comprising at least one solid stabilizing agent and at least one solid foaming agent; of a mixture comprising at least one solid stabilizing agent and at least one solid sorbing agent; and of a mixture comprising at least one solid stabilizing agent and at least one solid foaming and sorbing agent is envisaged in particular. The definitions below relating to the solid stabilizing agent (solid particles, nature and shape) also apply to the solid foaming and/or sorbing agents.

Nickel ferrocyanides ppFeNi, which sorb caesium, are an example of a solid agent having sorbing properties. The particles of colloidal silica with a diameter of 650 nm, at 54 g/l, grafted with aminopropyltriethoxysilane in a proportion of 15 molecules per $nm^2$ are an example of a solid agent having foaming properties.

In the context of the present invention, the use of the compounds as defined in the first embodiment in combination with mixtures as defined in the second embodiment is also envisaged.

The solid stabilizing agent, such as solid particles, is present, in the foaming aqueous solution forming the stabilized foam according to the invention, in a content ranging from 0.01% to 25%, in particular from 0.05% to 10% by weight, especially from 0.1% to 5% by weight and more particularly from 0.5% to 3% by weight, with respect to the total weight of the solution. When solid foaming and/or sorbing agents are added, in addition to the purely stabilizing solid agents, the percentage as total weight of solid agents is less than or equal to 30%.

The solid stabilizing agent, such as solid particles, can be of spherical shape or any shape entirely and can exhibit a monodisperse or polydisperse size distribution. Advantageously, the solid particles have characteristic dimensions of between 2 nm and 200 μm and in particular between 5 nm and 30%.

The solid stabilizing agent can be provided in the form of entirely mineral (i.e., entirely inorganic) solid particles, of entirely organic solid particles, of mineral-organic hybrid particles or of a mixture of at least two of these types of particles, which are identical or different. The hybrid nature can consist of an organic core and a mineral surface, or vice versa.

In addition, whether the solid particles employed in the present invention are mineral and/or organic, as explained above, their surface can be either homogeneously hydrophilic or homogeneously hydrophobic or exhibit hydrophilic surface areas representing from 0.01 to 99.99% of the total surface area, the remainder of the surface (99.99 to 0.01% of the total surface area) being hydrophobic. In the case where both these types of areas are clearly separated, the particles are known as "amphiphilic particles".

Finally, the solid particles according to the invention can be functionalized by grafting organic molecules. The organic molecules to be grafted to the solid particles according to the invention exhibit the advantage in particular of improving the properties of sorption of the chemical entities, such as radioelements, detached from the surface to be treated. In this case, the organic molecules can be extracting and/or complexing organic molecules, such as polydentate ligands (for example, EDTA ethylenediaminetetraacetic acid), calixarenes or crown ethers. In an alternative form, the organic molecules grafted to the solid particles can be used to modify or improve the hydrophilic, hydrophobic or amphiphilic nature of the said particles. A person skilled in the art knows different organic molecules which can be used to obtain these different results.

Various types of solid particles which can be used in the context of the present invention and given as nonlimiting examples are listed below.

The mineral solid particles according to the invention include particles of phosphotungstic acid, of nickel ferrocyanide or of oxide, hydroxide, carbonate, sulfate, nitrate, oxalate and/or titanate of one or more (for example, an aluminosilicate mixed oxide) entity(ies) chosen from alkali metals (for example, $Na_2O.Al_2O_3.4SiO_2$), alkaline earth metals (for example, $CaO.Fe_2O_3$, $CaCO_3$, $BaSO_4$, $BaTiO_3$, $Ca_3(PO_4)_2$), transition metals (for example, $TiO_2$, $Fe_2O_3$, $ZrO_2$, $MnO_2$) and semimetals (for example, $SiO_2$). Such solid particles are available in particular from Acros Organics.

Advantageously, mention may be made, as mineral solid particles which sorb radioelements and which can be used in the context of the present invention, of particles of $Ca_3(PO_4)_2$, $CaCO_3$, $MnO_2$, phosphotungstic acid ($H_3PO_4.12WO_3.xH_2O$) and nickel ferrocyanide (ppFeNi). Specifically, strontium is captured in a basic medium (pH>11) by $Ca_3(PO_4)_2$, $CaCO_3$ or $MnO_2$. Cesium is captured in an acidic medium by phosphotungstic acid ($H_3PO_4.12WO_3.xH_2O$) and in a moderately basic medium (pH<10) by nickel ferrocyanide ppFeNi. Apart from nickel ferrocyanide, formed in situ by the reaction between potassium ferrocyanide and nickel sulfate, all these reactants are available, for example from Acros Organics.

In the context of the present invention, the entirely organic particles are composed of thermoplastic and/or thermosetting polymers or copolymers and/or of biopolymers.

Advantageously, the organic solid particles are solid particles of thermoplastic polymers or copolymers of the following families:

TABLE 1

Polymers composing the organic particles used

| Polymer family | Examples | Supplier |
|---|---|---|
| Polyolefins | Polyethylene | Acros Organics |
| Polyvinyls | Poly(vinyl alcohol) | Acros Organics |
| Polyvinylidenes | Poly(vinylidene chloride) | Aldrich |
| Polystyrenes | Polystyrene | Aldrich |
| Acrylics/methacrylics | Poly(methyl methacrylate) | Acros Organics |
| Polyamides | Poly(caprolactam) | Acros Organics |
| Polyesters | Polyterephthalates | Acros Organics |
| | Polycarbonates | Acros Organics |
| Polyethers | Polyoxyethylene | Acros Organics |
| Poly(arylene sulfone)s | Polysulfones | Aldrich |
| Polysulfides | Poly(phenylene sulfide) | Solvay |
| Polyfluorinated polymers | Polytetrafluoroethylene | Acros Organics |
| Cellulose polymers | Cellulose acetate | Acros Organics |
| Poly(aryl ether ketone)s | Poly(ether ketone) | Solvay |
| Polyimides | | Aldrich |
| Polyetherimides | | Aldrich |

The families of the thermosetting polymers or copolymers, such as aminoplasts (urea-formaldehyde resins), polyurethanes, unsaturated polyesters, phenoplasts (phenol-formaldehyde resins), polysiloxanes, epoxide, allyl and vinyl ester resins, alkyds (phthalic glycerol alkyd resins), polyureas, polyisocyanurates, poly(bismaleimide)s and polybenzimidazoles are added to this list. The particles resulting from these polymers can be synthesized by radical, anionic or cationic polymerization, polycondensation or copolymerization/copolycondensation, by the thermal, photochemical or radiochemical route, in emulsion, in suspension, and by precipitation. The precursors on which these polymers are based are available from Aldrich, Acros Organics, Fluka and Arkema.

Finally, biopolymers, such as microbial biopolymers (polyhydroxyalkanoates and derivatives), biopolymers resulting from plants (for example, starch, cellulose, lignin and derivatives) and biopolymers resulting from the chemical polymerization of biological entities (polylactics), are added to this list.

The organic solid particles can also be composed of copolymers comprising the monomer units on which the above polymers are based, such as, for example, poly(vinylidene chloride)-co-poly(vinyl chloride) or poly(styrene/acrylonitrile) copolymers.

In the context of the present invention, the organic/mineral hybrid solid particles can have a surface, at least a portion of which is mineral, and an organic core, or vice versa. Advantageously, these mineral-organic hybrid particles exhibit

- either an organic core, composed of at least one chemical compound chosen from the compounds which can be used for the organic solid particles described above, and a surface, at least a portion of which is mineral and composed of at least one chemical compound chosen from the compounds which can be used for the mineral solid particles described above,
- or a mineral core, composed of at least one chemical compound chosen from the compounds which can be used for the mineral solid particles described above, and a surface, at least a portion of which is organic and composed of at least one chemical compound chosen from the compounds which can be used for the organic solid particles described above.

It is clear that, in the present invention, both the hybrid particles with an organic core and an entirely mineral surface (or the reverse, namely a mineral core and an entirely organic surface) and the hybrid particles which have an organic core (or mineral core) and a surface exhibiting a hydrophilic mineral part and a hydrophobic organic part are envisaged as alternative forms. Particles of the latter type corresponding in particular to amphiphilic particles, which are also hybrid particles, are described in Reculusa S. and Poncet-Legrand C., "Hybrid Dissymetrical Colloidal Particles", Chem. Mater., 2005, 17, 3338-3344. The hybrid particles can exhibit an organic surface part and a mineral surface part.

These hybrid particles can, for example, be prepared by vapour phase epitaxial growth (or vapour phase chemical deposition) or liquid phase epitaxial growth (by chemical precipitation of a mineral layer on an organic particle). In the latter case, mention may be made of polystyrene (or polyisoprene) hybrid particles covered with $TiO_2$ or $SiO_2$ described in patent No. EP 1 053 277. The particles with an inverse configuration (mineral core and organic surface) can easily be formed by coating the mineral particles with the polymers described in detail above.

Moreover, these synthetic techniques make it possible to form amphiphilic heterogeneous mineral or organic particles which are included in the list of the particles which may be suitable for the formulation of the foams of the present patent.

Finally, the hybrid particles may also, for example, be mesoporous silica particles grafted, at the surface, with extracting or complexing organic molecules, such as polydentate ligands (for example, EDTA—ethylenediaminetetraacetic acid), calixarenes or crown ethers.

The foaming aqueous solution forming the stabilized form according to the invention comprises a decontamination, stripping and/or degreasing agent. Such an agent is chosen according to the use for which the foam is intended. When the foam is a decontamination foam, the active agent is chosen in particular as a function of the nature of the contamination and of the surface to be decontaminated.

Advantageously, the decontamination, stripping and/or degreasing agent is chosen from an acid or a mixture of acids, a base or a mixture of bases, an oxidizing agent (for example $H_2O_2$), a reducing agent, a disinfecting agent, an antioxidant, an antiseptic agent, and the like. A person skilled in the art knows how to choose the decontamination, stripping and/or degreasing agent according to the treatment to be carried out.

More particularly, the decontamination, stripping and/or degreasing agent can be chosen from an inorganic or organic acid ("acidic foam"), an inorganic base ("alkaline foam"), an oxidizing agent ("oxidizing foam") or their mixtures and very particularly an acid/oxidizing agent mixture or a base/oxidizing agent mixture. Thus, in the context of a decontamination treatment in accordance with the present invention, an acidic or alkaline foam can exhibit either properties of dissolution of irradiating radioactive deposits, for example in order to remove cases of contamination not attached to a surface, or properties of controlled corrosion of the surface, for a contamination attached to the latter.

According to a first alternative form, the decontamination, stripping and/or degreasing agent is an inorganic acid chosen from hydrochloric acid, nitric acid, hydrofluoric acid, sulfuric acid, phosphoric acid, oxalic acid, formic acid, citric acid, ascorbic acid and their mixtures. According to the invention, the acid is advantageously present at a concentration of 0.1 to 7 mol, in particular of 0.2 to 6 mol, especially of 0.5 to 5 mol and more particularly of 1 to 4 mol. These concentration ranges relate, of course, to the concentration of $H^+$ ions given for the preparation of 1 liter of foaming solution.

According to a second alternative form, the decontamination, stripping and/or degreasing agent is an inorganic base chosen from sodium hydroxide, potassium hydroxide, sodium carbonate, potassium carbonate and their mixtures. According to the invention, the base is advantageously present at a concentration of less than 4 $mol \cdot l^{-1}$, preferably ranging from 0.5 to 1.5 $mol \cdot l^{-1}$. These concentration ranges relate, of course, to the concentration of $OH^-$ ions given for the preparation of 1 liter of foaming solution.

The foaming aqueous solution forming the stabilized foam according to the invention can additionally comprise a surface-active agent, an inorganic oxidizing agent, a complexing agent and/or an organic gelling agent.

Specifically, the foaming aqueous solution forming the stabilized foam according to the invention can comprise at least one surface-active agent and more particularly just one surface-active agent or a mixture of at least two surface-active agents chosen from nonionic foaming surfactants, anionic or cationic foaming surfactants, amphoteric surfactants, surfactants with a structure of bolaform type, surfactants with a structure of Gemini type and polymeric surfactants. More particularly, the stabilized foam according to the invention can comprise just one surface-active agent or a mixture of at least two surface-active agents chosen from alkylpolyglucosides, sulfobetaines, alkanolamides, block copolymer surfactants (such as block copolymers based on ethylene oxide or on propylene oxide), ethoxylated alcohols and amine oxides.

In a first alternative form of the present invention, the surface-active agent employed is a nonionic foaming surfactant. Such a nonionic foaming surfactant is described in international application WO 2004/008463. It is, for example, chosen from the family of the alkylpolyglucosides or alkyl polyether glucosides, which are natural derivatives of glucose and biodegradable. They are, for example, "Oramix CG-110" from SEPPIC or "Glucopon 215 CS" from Cognis.

In a second alternative form of the present invention, the surface-active agent employed is an amphoteric surfactant, for example of the family of the sulfobetaines or alkylamidopropylhydroxysulfobetaines, such as "Amonyl 675 SB", sold by SEPPIC, or of the family of the amine oxides, such as "Aromox MCD-W", a cocodimethylamine oxide sold by Akzo Nobel.

In the foaming aqueous solution forming the stabilized foam according to the invention, the surface-active agent is present in a proportion of 0.01 to 2% by weight, in particular of 0.1 to 1.8% by weight, especially of 0.2 to 1.5% by weight and very particularly of 0.5 to 1% by weight, with respect to the total weight of the solution.

Furthermore, the foaming aqueous solution forming the stabilized foam according to the invention can also comprise an inorganic oxidizing agent advantageously chosen from potassium permanganate, cerium(IV) salts, potassium dichromate and their mixtures. According to the invention, the concentration of oxidizing agent in the foaming solution is less than or equal to 1M, in particular of between 0.05 and 0.5M, especially of between 0.1 and 0.4M and more particularly of between 0.2 and 0.3M.

In addition, the foaming aqueous solution forming the stabilized foam according to the invention can also comprise a complexing agent advantageously chosen from carbonates and polydentate ligands, such as EDTA, at concentrations of less than or equal to 1M, in particular of between 0.01 and 0.5M, especially of between 0.02 and 0.1M and more particularly of between 0.05 and 0.1M.

Finally, according to the present invention, the foaming solution forming the stabilized foam can comprise, in addition to the components mentioned above, an organic gelling (or viscosifying) agent in a content of less than or equal to 0.05% by weight, in particular of less than or equal to 0.04% by weight and especially of less than or equal to 0.02% by weight, with respect to the total weight of the solution.

This gelling agent is advantageously a biodegradable gelling agent more particularly chosen from heterogeneous polysaccharides, such as pectins, alginates, agars, carrageenans, locust seed flour, guar gum and xanthan gum.

The stabilized foam according to the present invention can be prepared in various ways. The present invention relates to a process for the preparation of a stabilized foam as defined above.

In a first embodiment of this preparation process, the various components of the foaming aqueous solution forming the said foam, i.e. the decontamination, stripping and/or degreasing active agent, the solid stabilizing agent and, optionally, the surface-active agent, the oxidizing agent, the complexing agent, the gelling agent and/or the solid foaming and/or sorbing agent, are mixed together to form an aqueous solution before generation of the foam. The introduction of these various components into the mixture can be carried out in any order. In the event of distinctive characteristics in the introduction of these agents, a person skilled in the art will know how to choose, by virtue of this knowledge, the order of introduction as a function of the agents employed.

In an alternative form of this first embodiment of the preparation process, the solid stabilizing agent can be formed in situ in the mixture. As explained above, this is in particular the case when the solid stabilizing agent is composed of solid particles of nickel ferrocyanide. This in situ formation can be more or less rapid. It can in particular take place in the presence of the contaminating chemical entities which, for this reason, can be coprecipitated with the solid particles thus formed.

In a second embodiment of this preparation process, the various components of the foaming aqueous solution forming the said foam, i.e. the decontamination, stripping and/or degreasing active agent and optionally the surface-active agent, the solid stabilizing agent, the solid foaming and/or sorbing agent, the oxidizing agent, the complexing agent and/or the gelling agent, are mixed together, all or part of the solid stabilizing agent and/or all or part of the solid foaming and/or sorbing agent being introduced directly into the gas to form a mist contacted with the foaming liquid and to generate the foam.

In a first alternative of this second embodiment of the preparation process according to the invention, the solid stabilizing agent is not present in the starting aqueous mixture and is introduced only by the gas.

In a second alternative of this second embodiment of the preparation process according to the invention, the solid stabilizing agent is not only introduced directly by the gas but is also present in the aqueous mixture as under the conditions as presented in the first embodiment of the preparation process (i.e., solid stabilizing agent mixed with the other components or produced in situ during the mixing).

The same alternatives as those described above for the solid stabilizing agent apply to the solid foaming and/or sorbing agent.

However, in order to better demonstrate the various alternatives envisaged as regards the processes for the preparation of the stabilized foam according to the present invention, the various possibilities when the stabilized foam comprises, in addition to a solid stabilizing agent, at least one solid foaming and/or sorbing agent are given in table 2 below. In table 2 below:

"stabilizing" is understood to mean a solid stabilizing agent, a solid foaming stabilizing agent, a solid sorbing stabilizing agent, a solid foaming and sorbing stabilizing agent or their mixtures;

"foaming and/or sorbing" is understood to mean a solid foaming agent, a solid sorbing agent, a solid foaming and sorbing agent or their mixtures;

a type of solid agent (i.e., either stabilizing or foaming and/or sorbing) mentioned twice on one line in table 2 can be identical or different.

TABLE 2

| Aqueous mixture | Gas |
|---|---|
| stabilizing<br>foaming and/or sorbing | |
| | stabilizing<br>foaming and/or sorbing |
| stabilizing | foaming and/or sorbing |
| foaming and/or sorbing | stabilizing |
| stabilizing<br>foaming and/or sorbing | foaming and/or sorbing |
| stabilizing<br>foaming and/or sorbing | stabilizing |
| stabilizing | stabilizing<br>foaming and/or sorbing |
| foaming and/or sorbing | stabilizing<br>foaming and/or sorbing |
| stabilizing<br>foaming and/or sorbing | stabilizing<br>foaming and/or sorbing |

In the various preparation processes described above, the foam can be generated by any system for generating foam of the prior art known to a person skilled in the art. It relates to any device which provides gas-liquid mixing, in particular by mechanical stirring, by sparging, by a static mixer comprising or not comprising beads, devices described in patent FR-A-2 817 170, or devices using a spray nozzle, and the like.

The present invention also relates to the use of a stabilized foam as defined above or of a stabilized foam prepared according to a process as defined above for decontaminating, stripping and/or degreasing a surface. Advantageously, the decontaminating of a surface is carried out by dissolution of irradiating surface deposits or by corrosion over a few millimeters of the contaminated wall. Furthermore, this use applies to cleaning but will be particularly advantageous for the decontamination of metal surfaces contaminated either by radioactive greasy or mineral deposits or by a layer of oxides. The contamination can also be located in a layer of several tens or hundreds of microns in the body of the material to be treated.

This use applies perfectly well to the decontamination of nuclear installations which are large in size and/or complex or inaccessible geometrically and for which the amounts of chemical reactants and liquid effluents finally to be treated are high.

The present invention also relates to a process for decontaminating, stripping and/or degreasing a surface which comprises the steps consisting in:

a) preparing a stabilized foam according to the preparation processes defined above, b) applying the stabilized foam obtained in step (a) to the surface to be treated.

Advantageously, in step (b) of the process for decontaminating, stripping and/or degreasing a surface, the stabilized foam is used under static conditions, under pseudostatic conditions (or under conditions of rise-rest cycles), under circulation conditions or under spray conditions.

According to the invention, the process for decontaminating, stripping and/or degreasing a surface can also include an additional step which consists in recovering the foam and/or the liquid forming the foam after the draining thereof.

In a first alternative form, this additional step consists in recovering, by suction, the foam which has not finished draining. The foam is then conveyed to a device for recovering the solid stabilizing agent of the solid particles type present therein, for example a particle filter.

In a second alternative form, this additional step consists in recovering the liquid forming the foam after the draining thereof, in order to separate the solid stabilizing agent of the solid particles type from the liquid. This separation can advantageously be carried out by settling, which may or may not be preceded by flocculation, centrifuging, filtering or any other device which makes it possible to recover a solid dispersed in a liquid. The solid stabilizing agent of the solid particles type thus recovered from the drained liquid can then be:

either reused in the decontaminating, stripping and/or degreasing process (recycling), or regenerated, in particular by desorption of the captured chemical entities, or removed by vitrification, bituminization or incineration.

According to the invention, the effluent devoid of the solid stabilizing agent recovered after the separation step as defined above is less contaminated and less able to foam. Specifically, such advantages are obtained by virtue of the foaming and sorbing properties of the solid agents present in the decontamination, stripping and/or degreasing foam according to the invention. The effluent thus recovered can be more easily treated, optionally after a step of mineralization, vitrified or bituminized.

The various techniques employed during the decontamination, stripping and/or degreasing process according to the invention, such as bituminization, vitrification, centrifuging, filtering, and the like, are techniques well known to a person skilled in the art.

Other characteristics and advantages of the present invention will also become apparent on reading the examples below, given by way of illustration and without implied limitation, and with reference to the appended figures.

BRIEF DESCRIPTION OF THE DRAWINGS

FIG. 2 presents the change over time in the standardized levels of liquid in the bottom of a measuring cylinder for foams of the state of the art (nitric/phosphoric acid foams comprising 1, 2, or 3 g/l of xanthan gum or 0 g/l of silica particles) and nitric/phosphoric acid foams according to the invention, i.e. comprising 10, 15 or 20 g/l of silica particles.

FIG. 3 presents the change over time in the standardized levels of liquid in the bottom of a measuring cylinder for an alkaline foam of the state of the art comprising 1 g/l of xanthan gum and for an alkaline foam according to the invention comprising 10 g/l of silica particles.

EXAMPLE 1

Comparison of the Drainage Kinetics of Viscosified Foams and Foams Comprising Particles I. Nitric/Phosphoric Acid Foams The drainage properties were studied on nitric/phosphoric acid foams prepared:

- from a foaming solution of Glucopon 215 CS (Cognis) with 1.5 M $H_3PO_4$ and 1.5 M $HNO_3$ and which comprises a biodegradable organic viscosifying agent, xanthan gum;
- from a foaming solution comprising the same concentrations of surfactant and acid but in which the viscosifying agent is replaced by Aerosil 380° particles at concentrations of 0, 10, 15 and 20 g/l. The Aerosil 380° particles, sold by Degussa (or Stochem), are particles of hydrophilic fumed silica exhibiting a specific surface of 380 $m^2/g \pm 30\ m^2/g$.

Figure 1:
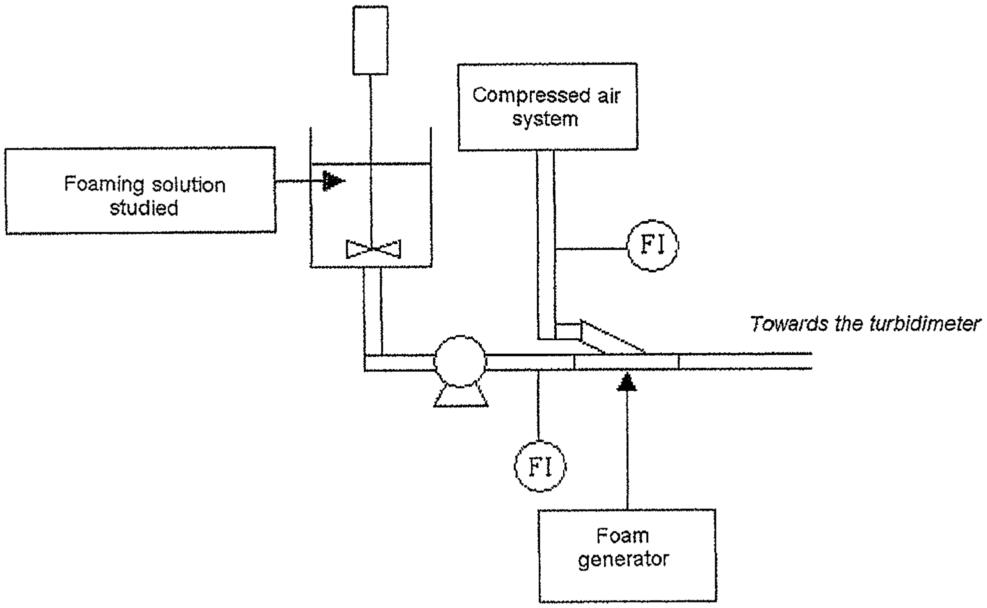
FIG. 1 presents the equipment used to generate foams according to the invention or of the state of the art, the drainage of which is quantified by measurements of turbidity over time.

These foaming solutions were used to generate foams with an expansion controlled using a static generator comprising glass beads, according to the protocol described in detail in FIG. 1.

The solutions prepared are also highly foaming since foams with an expansion of volume of the order of 10 were thus prepared.

The drainage kinetics of these foams are monitored by plotting the turbidimeter values of the foams as a function of time. The principle of this measurement is based on the difference in behavior of a foam and of a liquid when they are illuminated by a near infrared light beam: the foam reflects it while the liquid transmits it. Thus, the appearance of the liquid at the bottom of the test tubes comprising the foams is expressed by a signal which increases over time.

Figure 2:
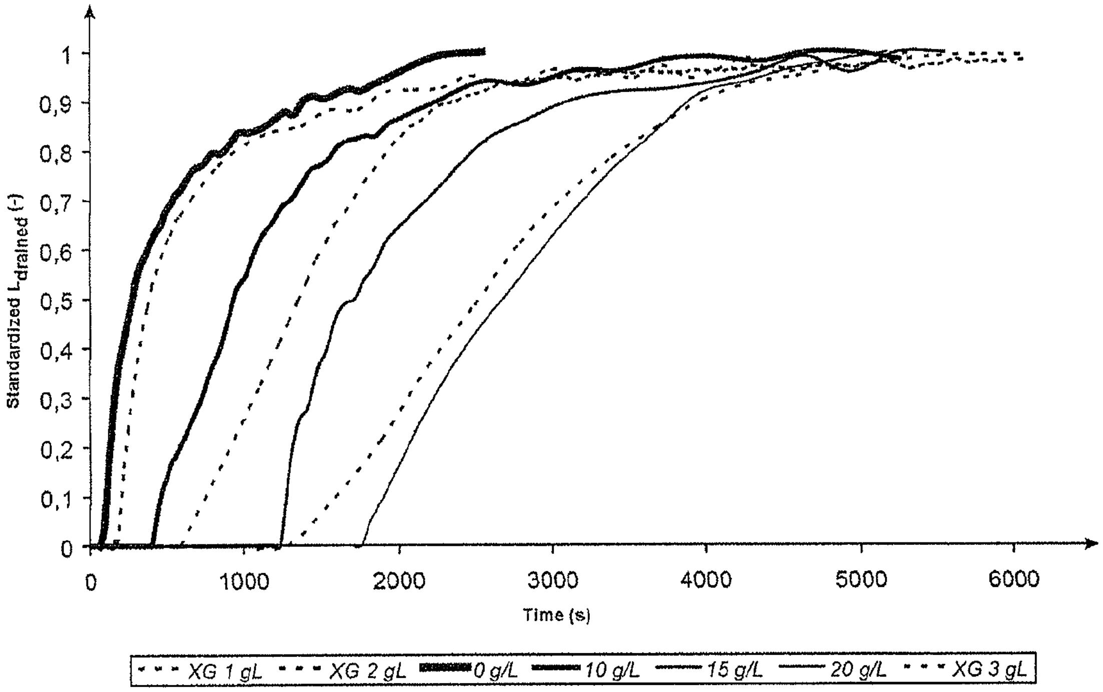
FIG. 2 presents the drainage kinetics obtained with the nitric/phosphoric acid foams of the state of the art or according to the invention. More particularly.

FIG. 2 presents the change over time in the levels of liquid in the bottom of a measuring cylinder for foams comprising 1, 2 or 3 g/l of xanthan gum and 0, 10, 15 or 20 g/l of silica particles.

The addition of approximately 10 g/l of silica makes it possible to obtain a delay time in the draining of the order of 8 min and it is even possible to achieve times of the order of 30 minutes for a concentration of 20 g/l. By way of comparison, the foam having a base solution comprising 1 g/l of xanthan gum exhibits a delay time of approximately 2 minutes.

The silica particles introduced thus perfectly fulfill their role of stabilizing the foam.

II. Alkaline Foams

The drainage properties of two alkaline foams composed of 1M sodium hydrogencarbonate $NaHCO_3$ were also studied, with the same experimental device.

One of the solutions comprises Aerosil 380 silica particles at 10 g/l and the other comprises xanthan gum at 1 g/l. The foaming surfactant is, in both cases, Glucopon 215 CS (Cognis) in a proportion of 10 grams of active material per liter.

Figure 3:
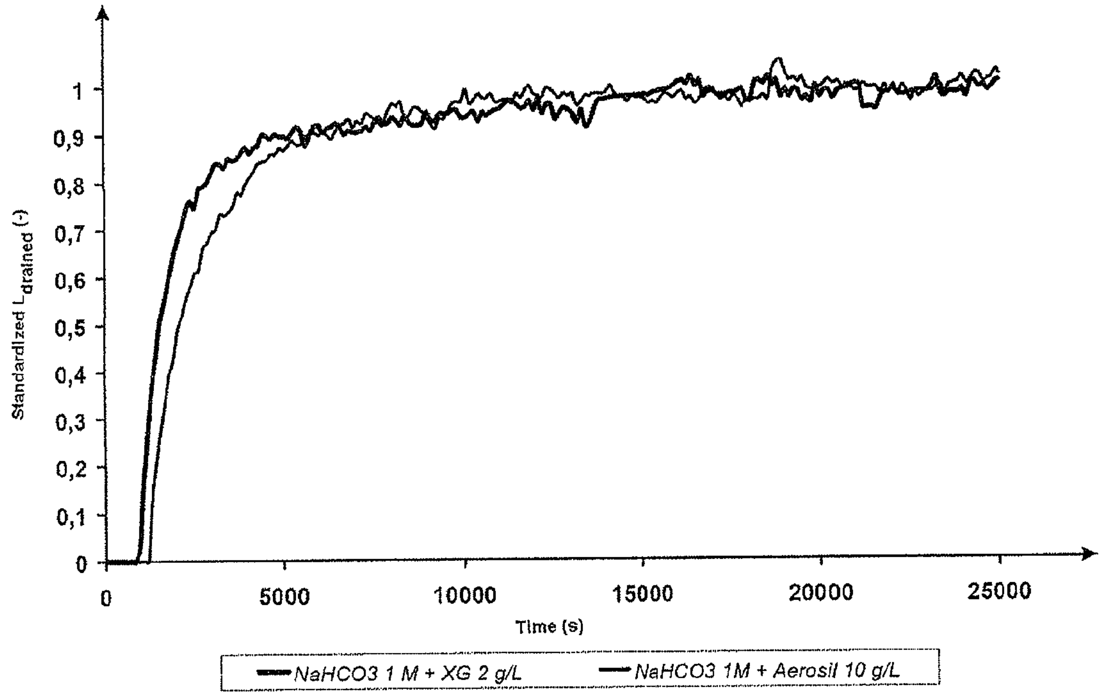
FIG. 3 presents the drainage kinetics obtained with the alkaline foams of the state of the art or according to the invention. More particularly.

FIG. 3 presents the change over time in the levels of liquid in the bottom of a measuring cylinder for the alkaline foam comprising 1 g/l of xanthan gum or 10 g/l of silica particles.

As shown in FIG. 3, the addition of solid particles to the formulation of the alkaline foam results here again in a clear stabilization of the latter. Furthermore, this stabilization is more marked than in the case of the acidic foams, since 10 g/l of Aerosil correspond approximately to 2 g/l of xanthan gum.

EXAMPLE 2

Comparison of the Levels of Foam Formed with Different Types of Particles

The ability to foam of suspensions of particles not comprising any molecular surface-active agent was studied.

The particles studied all have a silica core. They are synthesized by the method developed by Kang et al. Some exhibit a surface functionalized and saturated by aminopropyltriethoxysilane (APTES), which reinforces their hydrophobicity.

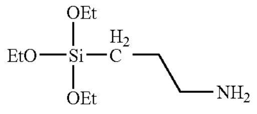

Formula of APTES

The systems studied are:

| | Concentration | Functionalization | Mean size |
|---|---|---|---|
| Water | / | / | / |
| Water + Aerosil 380® | 20 g · $l^{-1}$ | / | 60-600 nm |
| Water + bare $SiO_2$ | 20 g · $l^{-1}$ | / | 700 ± 30 nm |
| Water + $SiO_2$ + APTES | 20 g · $l^{-1}$ | APTES | 700 ± 30 nm |

The Aerosil 380® particles are sold by Stochem. The diameter of the primary particles is 7 nm. In solution, the silica adopts a structure of fractal aggregates of 60 to 600 nm.

The size of the particles of bare or grafted colloidal silica is determined by photon correlation spectroscopy on a Zetasizer Nano-ZS sold by Malvern.

The foam is generated in a column analogous to that developed by J. J. Bikerman. This is a cylindrical glass column with a height of 70 cm and a diameter of 3 cm. It is provided at its base with a size 4 sintered disk which makes it possible to bubble compressed air at 3 bar into the suspension.

30 ml of the suspension, subjected beforehand to ultrasound for 10 minutes, are introduced for each of the characterization experiments. The air flow rate is set at 40 $l \cdot h^{-1}$. The level of foam formed above the liquid is measured after bubbling for 5 minutes.

The results obtained are as follows:

| | Level of foam |
|---|---|
| Water | 0 cm |
| Water + Aerosil 20 $g \cdot l^{-1}$ | −1 cm |
| Water + bare $SiO_2$ | 3.5 cm |
| Water + $SiO_2$ + APTES | 13.2 cm |

The water comprising Aerosil 380® does not expand in volume during the passage of the air. On the other hand, expansion in volume begins with the bare colloidal particles. This expansion in volume becomes very large when these same particles are grafted.

The functionalization of the surface of colloidal particles thus promotes the ability of the suspension to foam.

The invention claimed is:

1. A stabilized foam composed of a dispersion of bubbles of air in a foaming aqueous solution, comprising:

from 0.1 to 7 mol of one or more decontamination, stripping and/or degreasing agent per liter of solution; and from 0.01 to 25% by weight with respect to the total weight of the solution, of solid particles of identical nature or of mixtures of solid particles of different nature, said solid particles presenting foaming properties, wherein said solid particles presenting foaming properties are solid entirely mineral particles functionalized by having hydrophobic organic molecules grafted thereon.

2. The stabilized foam as recited in claim 1, further comprising at least solid particles presenting sorbing properties.

3. The stabilized foam as recited in claim 1, wherein the entirely mineral particles are made of phosphotungstic acid, of nickel ferrocyanide or of oxide, of hydroxide, of carbonate, of sulfate, of nitrate, of oxalate and/or of titanate of one or more entity(ies) chosen from alkali metals, alkaline earth metals, transition metals and semimetals.

4. The stabilized foam as recited in claim 1, wherein said decontamination, stripping and/or degreasing agent is selected from the group consisting of an acid or a mixture of acids, a base or a mixture of bases, an oxidizing agent, a reducing agent, a disinfecting agent, an antioxidant, an antiseptic agent and their mixtures.

5. The stabilized foam as recited in claim 1, wherein said foaming aqueous solution additionally comprises a surface-active agent, an inorganic oxidizing agent, a complexing agent and/or an organic gelling agent.

6. The stabilized foam as recited in claim 4, wherein said foaming aqueous solution comprises:

a single surface-active agent or a mixture of at least two surface-active agents chosen from nonionic foaming surfactants, anionic or cationic foaming surfactants, amphoteric surfactants, surfactants with a bolaform structure, surfactants with a Gemini structure and polymeric surfactants.

7. A process for the preparation of a stabilized foam composed of a dispersion of bubbles of air in a foaming aqueous solution, the process comprising:

mixing together from 0.1 to 7 mol of one or more decontamination, stripping and/or degreasing agent per liter of solution; and from 0.01 to 25% by weight with respect to the total weight of the solution, of solid particles of identical nature or of mixtures of solid particles of different nature, said solid particles presenting foaming properties, wherein said solid particles presenting foaming properties are solid entirely mineral particles functionalized by having hydrophobic organic molecules grafted thereon.

* * * * *